(12) United States Patent
Salhab et al.

(10) Patent No.: US 12,548,589 B1
(45) Date of Patent: Feb. 10, 2026

(54) SYSTEMS AND METHODS FOR GENERATING AUDIO DESCRIPTIONS

(71) Applicant: CNTXT FZCo, Dubai (AE)

(72) Inventors: Mahmoud Ammar Salhab, Dubai (AE); Shameed Sait Muhamed Ali, Dubai (AE); Mohammad Mohammad AbuSheikh, Dubai (AE); Hasan Mohammad AbuSheikh, Dubai (AE)

(73) Assignee: CNTXT FZCo, Dubai (AE)

( * ) Notice: Subject to any disclaimer, the term of this patent is extended or adjusted under 35 U.S.C. 154(b) by 0 days.

(21) Appl. No.: 19/338,646

(22) Filed: Sep. 24, 2025

(51) Int. Cl.
*G10L 25/00* (2013.01)
*G06V 10/70* (2022.01)
(Continued)

(52) U.S. Cl.
CPC ............. *G10L 25/57* (2013.01); *G06V 10/70* (2022.01); *G06V 20/46* (2022.01); *G10L 13/02* (2013.01); *G10L 17/02* (2013.01); *G10L 25/18* (2013.01)

(58) Field of Classification Search
CPC ......... G10L 25/30; G10L 13/00; G10L 25/57; G10L 13/033; G10L 13/027; G10L 13/047; G10L 21/06; G10L 21/055; G10L 21/04; G10L 21/00; G10L 21/10; G10L 2021/105; G10L 21/16; G10L 25/78; G10L 2025/783; G10L 2025/786; G10L 25/81; G10L 25/84; G10L 25/87; G10L 15/20; G10L 15/063; G10L 21/0272; G06F 18/25; G06F 16/3329; G06F 18/214; G06F 3/048; G06F 40/20; G06N 20/00; G06N 3/0442; G06N 3/0455; G06N 3/0464; G06N 3/08;
(Continued)

(56) References Cited

U.S. PATENT DOCUMENTS 10,334,202 B1 6/2019 Zhou et al.
11,151,979 B2 * 10/2021 Lu .................. G10L 19/0018
(Continued)

FOREIGN PATENT DOCUMENTS

CN 111916050 A 11/2020
CN 112349269 A 2/2021
(Continued)

OTHER PUBLICATIONS

J. Liu, W. Wang, S. Chen, X. Zhu and J. Liu, "Sounding Video Generator: A Unified Framework for Text-Guided Sounding Video Generation," in IEEE Transactions on Multimedia, vol. 26, pp. 141-153, 2024. (Year: 2024).*
(Continued)

*Primary Examiner* — Edgar X Guerra-Erazo
(74) *Attorney, Agent, or Firm* — Tucker Ellis LLP; Ross M. Kowalski

(57) ABSTRACT

Systems and methods for generating audio description in a particular voice. A voice clip comprising the voice of a speaker is processed by a first transformer to generate audio tokens. An image or video to be described by the audio description is processed by a second transformer to generate visual tokens. A decoder processes the audio and visual tokens to generate acoustic tokens. At least some of the acoustic tokens are generated in a zero-shot manner. The acoustic tokens are converted to an audio waveform of the audio description in the voice of the speaker.

20 Claims, 5 Drawing Sheets

(51) Int. Cl.
    *G06V 20/40*         (2022.01)
    *G10L 13/02*         (2013.01)
    *G10L 17/02*         (2013.01)
    *G10L 25/18*         (2013.01)
    *G10L 25/57*         (2013.01)

(58) Field of Classification Search
CPC . G06N 3/09; G06N 5/022; G06N 5/04; G06T 2207/10016; G06T 2207/20081; G06T 2207/20084; G06V 10/82; G06V 20/20; G06V 20/41; G06V 20/46; G06V 20/64; G06V 10/44; G06V 10/7715; G06V 10/774; G06V 10/806; G06V 40/174; G06V 40/20; H04N 21/816; H04N 21/8549; H04N 21/466; H04N 21/854; G10H 2220/441; G10H 2210/056
See application file for complete search history.

(56) References Cited

U.S. PATENT DOCUMENTS

| | | | |
|---|---|---|---|
| 11,915,689 B1 | 2/2024 | Agostinelli et al. | |
| 12,087,268 B1* | 9/2024 | Ouyang | G10L 13/02 |
| 12,142,047 B1 | 11/2024 | Schwartz et al. | |
| 2021/0012769 A1 | 1/2021 | Vasconcelos et al. | |
| 2021/0142782 A1 | 5/2021 | Wolf et al. | |
| 2021/0350135 A1* | 11/2021 | Salamon | H04S 7/302 |
| 2022/0301545 A1 | 9/2022 | Kang et al. | |
| 2022/0319493 A1 | 10/2022 | Ohishi et al. | |
| 2023/0122905 A1* | 4/2023 | Mosseri | G06V 20/41 |
| | | | 704/235 |
| 2024/0347039 A1 | 10/2024 | Ijima et al. | |
| 2024/0362272 A1* | 10/2024 | Lee | G06F 40/40 |
| 2024/0379090 A1* | 11/2024 | Kang | G10L 25/30 |
| 2024/0380949 A1 | 11/2024 | Yang et al. | |

FOREIGN PATENT DOCUMENTS

| | | | |
|---|---|---|---|
| CN | 112802445 A | 5/2021 | |
| CN | 113889074 A | 1/2022 | |
| CN | 114596836 A | 6/2022 | |
| CN | 115273810 A | 11/2022 | |
| CN | 115831119 A | 3/2023 | |
| CN | 116405744 A | 7/2023 | |
| CN | 118840997 A | 10/2024 | |
| CN | 119136020 A | 12/2024 | |
| CN | 119479609 A | 2/2025 | |
| CN | 119785761 A | 4/2025 | |
| CN | 119811400 A | 4/2025 | |
| EP | 4191586 A1 | 6/2023 | |
| IN | 202141013921 A | 4/2021 | |
| IN | 202441080609 A | 11/2024 | |
| KR | 20220143273 A | 10/2022 | |
| WO | 2019023869 A1 | 2/2019 | |
| WO | 2024159120 A1 | 8/2024 | |
| WO | 2024226842 A1 | 10/2024 | |

OTHER PUBLICATIONS

Kondratyuk, Dan, et al. "Videopoet: A large language model for zero-shot video generation." arXiv preprint arXiv:2312.14125 (2023). (Year: 2023).*

* cited by examiner

SYSTEMS AND METHODS FOR GENERATING AUDIO DESCRIPTIONS

TECHNICAL FIELD

The present disclosure relates to systems and methods for generating an audio description of an image or video and in particular to the generation of the audio description in a user submitted voice.

BACKGROUND

An audio description is a spoken narrative that provides information about what is depicted (e.g., visual elements, contents, and events) in visual-based media such as images, videos, films, TV shows, or live performances. It is designed to make visual content accessible to people in an audible manner, particularly those who are blind or visually impaired, by describing contents, actions, facial expressions, scene changes, and other important visual details. As such, audio descriptions help convey the full experience of the content without relying on sight. Accordingly, audio descriptions can be valuable in different fields including education and content creation, allowing people to easily create accessible content and describe ideas.

Advancements in computer vision, natural language processing, and text-to-speech technologies have enabled automated systems to interpret and describe visual content such as images and videos. These systems are particularly valuable in accessibility applications, providing blind or visually impaired users with spoken descriptions of visual media. However, current solutions typically rely on generic or robotic voices, which can limit user engagement, personalization, and the overall listening experience. There remains a need for systems that not only generate accurate and contextually rich descriptions but also deliver them in a voice that aligns with a desired persona or preference, such as a familiar narrator, character, or brand voice.

Voice-specific audio descriptions can enhance the accessibility and enjoyment of visual media by aligning the narration style and tone with the content or user expectations. For instance, educational videos could benefit from narration in a teacher-like voice, while cinematic content might be enhanced with a dramatic or actor-specific voice. Despite existing voice synthesis technologies, there is limited integration between image/video analysis and targeted voice synthesis pipelines capable of delivering high-quality, personalized audio descriptions in real time or near-real time.

There is therefore a need for systems and methods that can seamlessly combine visual understanding, natural language generation, and voice synthesis to produce audio descriptions of images and videos in a particular, specified voice. Such systems would not only improve accessibility for users with visual impairments but also broaden the potential applications in entertainment, education, marketing, and content personalization.

Accordingly, improved systems and methods for generating audio descriptions remains highly desirable.

SUMMARY in accordance with a first aspect of the present disclosure, an audio description generation method is disclosed, comprising: receiving audio data comprising a voice of a speaker; processing the audio data with a first machine learning model to generate audio tokens for the voice; processing visual data corresponding to an image or a video from the audio data with a second machine learning model to generate visual tokens for the visual data; and generating an audio description for the visual data using the voice by processing the audio tokens and visual tokens with a decoder, wherein the first and second machine learning models are each a transformer encoder-decoder model. At least some of the audio description is generated in a zero-shot manner.

In some aspects, the audio data is a voice clip of an utterance of the speaker captured by a device.

In some aspects, the audio embeddings correspond to a voice print of the speaker.

In some aspects, the voice clip is less than 30 seconds in length.

In some aspects, the visual data is an image or video clip captured by a device.

In some aspects, the audio tokens are wrapped with a start of audio token and an end of audio token.

In some aspects, the visual tokens are wrapped with a start of visual token and an end of visual token.

In some aspects, the audio tokens and visual tokens are concatenated into an embedding layer for processing by the decoder.

In some aspects, a language token corresponding to a language of the audio description is processed with the audio tokens and the visual tokens by the decoder.

In some aspects, the generating comprises: generating acoustic tokens corresponding to the audio description using the decoder; and translating the acoustic tokens into an output audio waveform using a speech decoder, the output audio waveform corresponds to the audio description of the image or video in the voice of the speaker.

In some aspects, the processing of the audio data comprises: generating audio embeddings by processing the audio data using an audio decoder of the first machine learning model; generating audio vectors by processing the audio embeddings using an audio decoder of the first machine learning model; and generating the audio tokens by processing the audio vectors using an audio vector quantizer of the first machine learning model.

In some aspects, the audio embeddings are audio representations of a first predetermined length.

In some aspects, the audio vectors are audio representations of a second predetermined length.

In some aspects, the processing of the visual data comprises: generating visual embeddings by processing the visual data using a visual decoder of the second machine learning model; generating visual vectors by processing the visual embeddings using a visual decoder of the second machine learning model; and generating the visual tokens by processing the visual vectors using a visual vector quantizer of the second machine learning model.

In some aspects, the visual embeddings are visual representations of a third predetermined length.

In some aspects, the visual vectors are visual representations of a fourth predetermined length.

In some aspects, decoder is a transformer decoder.

In some aspects, the audio data is an input audio waveform; and the method further comprises: converting the input audio waveform into a mel-spectrogram for processing by the first machine learning model.

In some aspects, the visual data is a video; and the method further comprises: extracting the frames of the video as visual data for processing by the second machine learning model.

In some aspects, the audio tokens comprise a first predetermined number of tokens; and wherein the visual tokens comprise a second predetermined number of tokens.

In some aspects, the method further comprises: playing the audio description.

In some aspects, the method further comprises: capturing the audio data and/or the visual data.

In accordance with another aspect of the present disclosure, a system is disclosed, comprising at least one processing unit configured to perform the method of any of the above aspects.

In accordance with another aspect of the present disclosure, a non-transitory computer medium storing computer readable instructions is disclosed, which, when executed by at least one processing unit, configure the at least one processing unit to perform the method of any of the above aspects.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
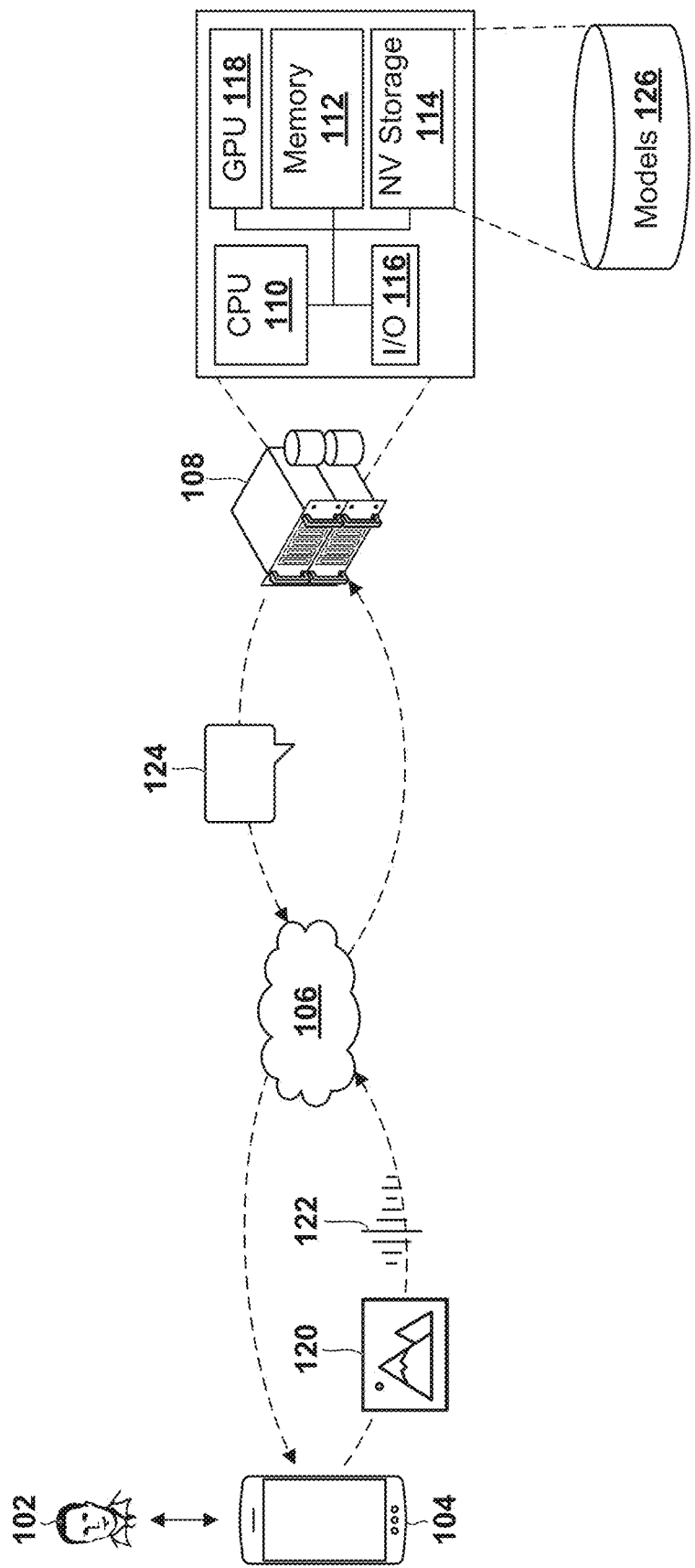
FIG. 1 depicts a system for generating audio descriptions, according to an example embodiment.

Machine learning, particularly deep learning, has played a transformative role in the field of image and video captioning. These systems typically employ convolutional neural networks (CNNs) to extract visual features from input images or video frames, which are then fed into recurrent neural networks (RNNs), long short-term memory networks (LSTMs), or transformer-based architectures to generate natural language descriptions. By learning from large datasets of annotated images and videos, these models are able to associate visual patterns with semantically meaningful phrases, enabling the automatic generation of descriptive captions.

In video captioning, machine learning models extend this framework to handle temporal dynamics by processing sequences of frames, each of which corresponds to a still image. This often involves using 3D CNNs or attention mechanisms to track objects and actions over time, allowing the model to produce coherent, context-aware narratives. Recent advances also incorporate multimodal learning, where visual data is fused with audio, text, or metadata to improve caption quality and relevance.

The generated captions can be translated into an audio description of the image or video through the use of text-to-speech or voice synthesis algorithms. Accordingly, existing methods have contemplated the use of machine learning in generating audio descriptions of images and videos by combining machine learning and speech synthesis.

However, many shortcomings exist with the existing methodologies. Notably, existing systems and methods do not provide any straightforward avenues for directly generating an audio description for an image or video with a user submitted voice. Even combining multiple programs, for example, ones for visual captioning and text-to-speech, users would still not be able to generate audio descriptions in a desired, submitted voice such as the user's own voice. Additionally, directly generating audio from text can result in the loss of contextual nuances such as emotions (and other visual information that might be depicted but not vocally described), which are only available in audio.

The present disclosure can address these shortcomings using a system comprising a plurality of machine learning models. In particular, the user can submit a short voice clip, such as of their own voice, and the disclosed system can then automatically generate audio descriptions of desired images and/or videos in the submitted voice. Further, the audio description can be generated in any desired language, without requiring the user to speak the language or to submit the voice clip in the language. That is, the output audio description can be spoken in a language different from the language used in the submitted voice clip while maintaining the voice characteristics of the speaker of the submitted voice clip. A generated audio description may be output in a voice not trained on by the machine learning models and contain words or phrases not present in the short voice clip, in which case the present disclosure facilitates zero-shot generation of the audio description.

In accordance with the present disclosure, a user submitted voice clip can be processed by an audio transformer corresponding to an audio encoder-decoder pair to generate audio tokens which capture the voice print of the speaker in the voice clip. A visual transformer corresponding to a visual encoder-decoder pair can process one or more images (e.g., a single still image, or a video comprising multiple still images in sequence in the form of video frames) to generate visual tokens that capture the depicted content of the image or video. A decoder can process the audio and visual tokens to generate acoustic tokens that capture the voice characteristics and depicted content. The acoustic tokens can be converted to an audio waveform of the audio description using a speech decoder and be output as audio using a vocoder. A language token can also be input to the decoder with the audio and visual tokens to generate the audio description in a particular language.

Embodiments are described below, by way of example only, with reference to FIGS. 1-3.

FIG. 1 depicts a system for generating audio descriptions, according to an example embodiment, shown in FIG. 1 as one or more servers 108. The implementation of the servers 108 is not restrictive and each of the servers 108 may be an on-premises server, cloud-based server, or a hybrid thereof, for example. A user 102 may interact with the servers 108 via a device 104 over a communications network 106 (e.g. the internet). The device 104 may be a mobile phone, as depicted in FIG. 1, but is not restricted to those devices expressly shown and may be any suitable device known in the art such as computer and tablets. The servers 108 may provide a graphical user interface (GUI) on the device 104 for ease of communication and operation control by the user. The implementation of the GUI is not restrictive and may be, for example, a mobile/computer application or a web page. The GUI can be used to provide input to and receive output from the servers 108. Additionally or alternatively, other user interfaces, such as an audio interface that allows receipt and processing of spoken commands, and that outputs spoken narratives, may be used.

The user 102 may be interested in generating audio descriptions for image or video 120 using the servers 108. In particular, the user 102 may wish to generate an audio description 124 of the image/video 120 in a voice from a voice clip 122. The image/video 120 and/or voice clip 122 may be captured by the device 104, for example using a camera and/or microphone of the device 104. Alternatively, the image/video 120 and/or voice clip 122 can be captured using suitable sensors (e.g., camera and/or microphone) communicatively coupled to the device 104. In some embodiments, the image/video 120 and/or voice clip 122 can be retrieved from local storage of the device 104 or external storage such as one or more external databases.

The servers 108 may be configured to process the image/video 120 and the voice clip 122 to generate the audio description 124. In particular, the image/video 120 and the voice clip 122 may be processed by one or more machine learning models 126 to generate the audio description 124, as described further herein. The machine learning models 126 may each be an artificial intelligence (AI) model or algorithm (e.g., a machine learning model or algorithm, such as a neural network or, more particularly, an autoencoder). The machine learning models 126 may comprise, in particular, a first transformer, a second transformer, and a decoder. The first transformer may be an audio encoder-decoder pair that processes the voice clip 122 to generate audio tokens; the second transformer may be a visual encoder-decoder pair that processes the image/video 120 to generate visual tokens; and the decoder can process the audio and visual tokens to generate acoustic tokens, which can be converted to the audio description 124 using a speech decoder. The audio description 124 may be returned to the user 102 from the server 108 via the device 104 as a waveform (e.g., for storage at the device 104), for example over the communications network 106. Alternatively, the audio description 124 may be played to the user using the device 104, for example using a speaker comprised in or coupled to the device 104.

According to the present disclosure, the image/video 120 and/or the voice clip 122 may be provided to or retrieved by the servers 108, for example, from the device 104. The image/video 120 and/or the voice clip 122 can also be retrieved from one or more external devices and/or one or more databases, comprised by the servers 108 or the device 104 or coupled thereto, for example over the communications network 106. The one or more databases may securely store the image/video 120 and/or the voice clip 122 to prevent unauthorized access and loss of sensitive data and may also store the generated audio description 124. The image/video 120 and/or the voice clip 122 may be requested and received using an application programing interface (API) via API requests/calls and responses, for example over the communications network 106, although other forms of communication such as Bluetooth™ and near-field communication are possible as well.

In a particular implementation, each of the servers 108 comprises a central processing unit ("CPU") 110, a non-transitory computer-readable memory 112, non-volatile storage 114, an input/output interface 116, and a graphical processing unit ("GPU") 118. The non-transitory computer-readable memory 112 comprises computer-executable instructions stored thereon at runtime which, when executed by the CPU 110, configure the server 108 to perform the herein described processes of audio description generation. The non-volatile storage 114 has stored on it computer-executable instructions that are loaded into the non-transitory computer-readable memory 112 at runtime. The input/output interface 116 allows the server 108 to communicate with one or more external devices such as the device 104 (e.g. via network 106). The non-transitory computer-readable memory 112 may also have stored thereon the machine learning models 126. The GPU 118 may be used to control a display and may be used to process the image/video 120 and/or the voice clip 122 to generate the audio description 124, including for example by running the machine learning models 126 to process the image/video 120 and the voice clip 122, as described further herein. In some embodiments, the machine learning models 126 may be stored at one or more separate servers. Accordingly, it is possible to interface with the machine learning models 126 for generating the audio description 124 through the use of APIs. In some embodiments, the machine learning models 126 may be stored on the device 104 and may be leveraged by the servers 108 via communications between the servers 108 and the device 104. The servers 108 and the device 104 may each provide a communications interface which allows software and data to be transferred, for example between the servers 108 and the device 104 over the communications network 106.

The CPU 110 and GPU 118 may be one or more processors or microprocessors, which are examples of suitable processing units, which may additionally or alternatively comprise an artificial intelligence accelerator, programmable logic controller, a microcontroller (which comprises both a processing unit and a non-transitory computer readable medium), neural processing unit (NPU), or system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

It should be noted that while FIG. 1 depicts the device 104 and the servers 108 as separate entities coupled over the communication network 106, the device 104 and servers 108 may also be coupled directly/physically using cable(s) for data transfer. In some embodiments, the servers 108 may also be the device 104 or comprise the device 104 (e.g. the servers 108 being implemented as a part of a computer system). In such an embodiment, the servers 108 may directly retrieve the image/video 120 and/or the voice clip 122 (as well as any other required data) from fixed local storage or removable local storage.

Figure 2A:
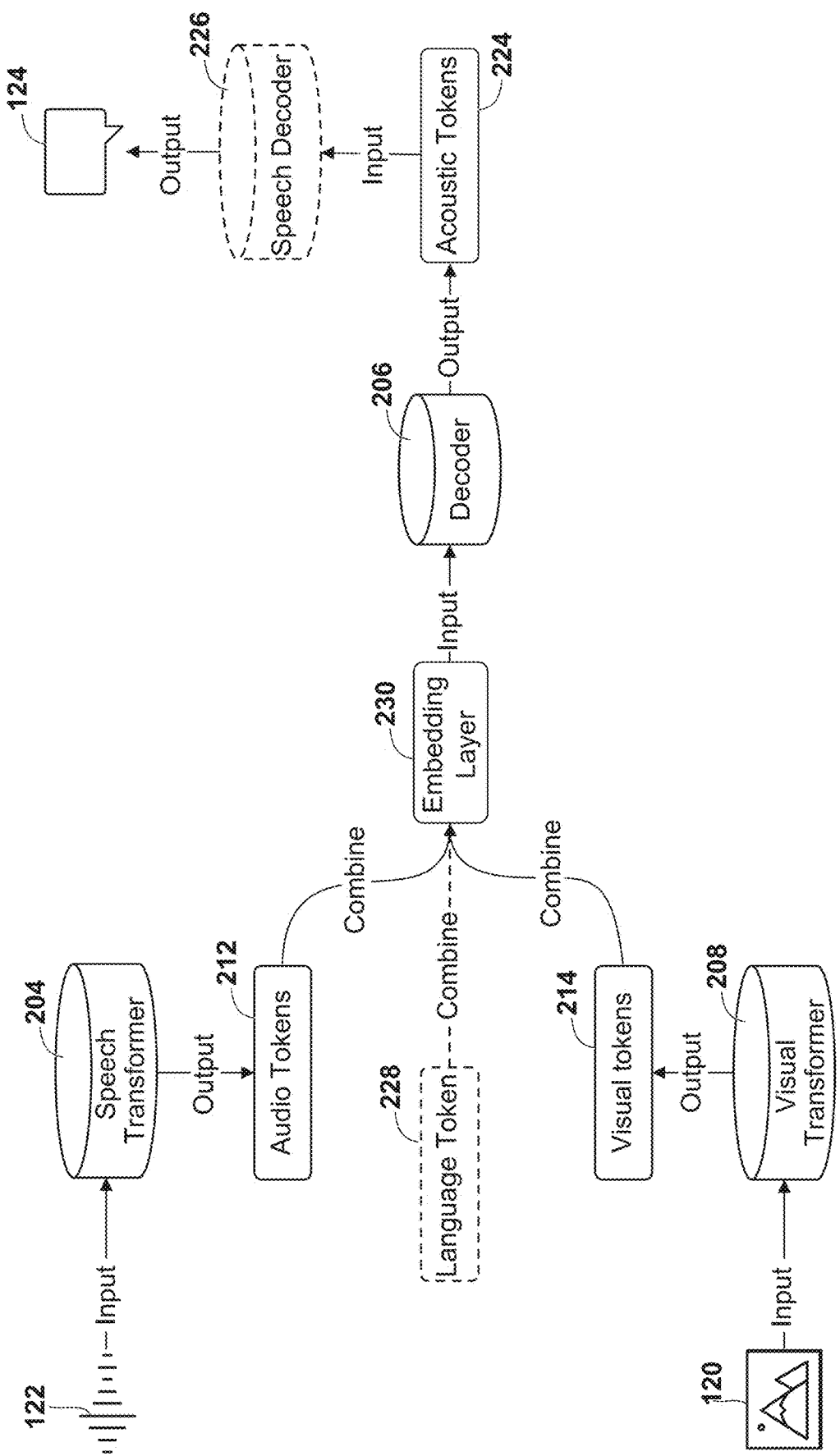
FIGS. 2A and 2B depict block diagrams of the system of FIG. 1, according to example embodiments.
Figure 2B:
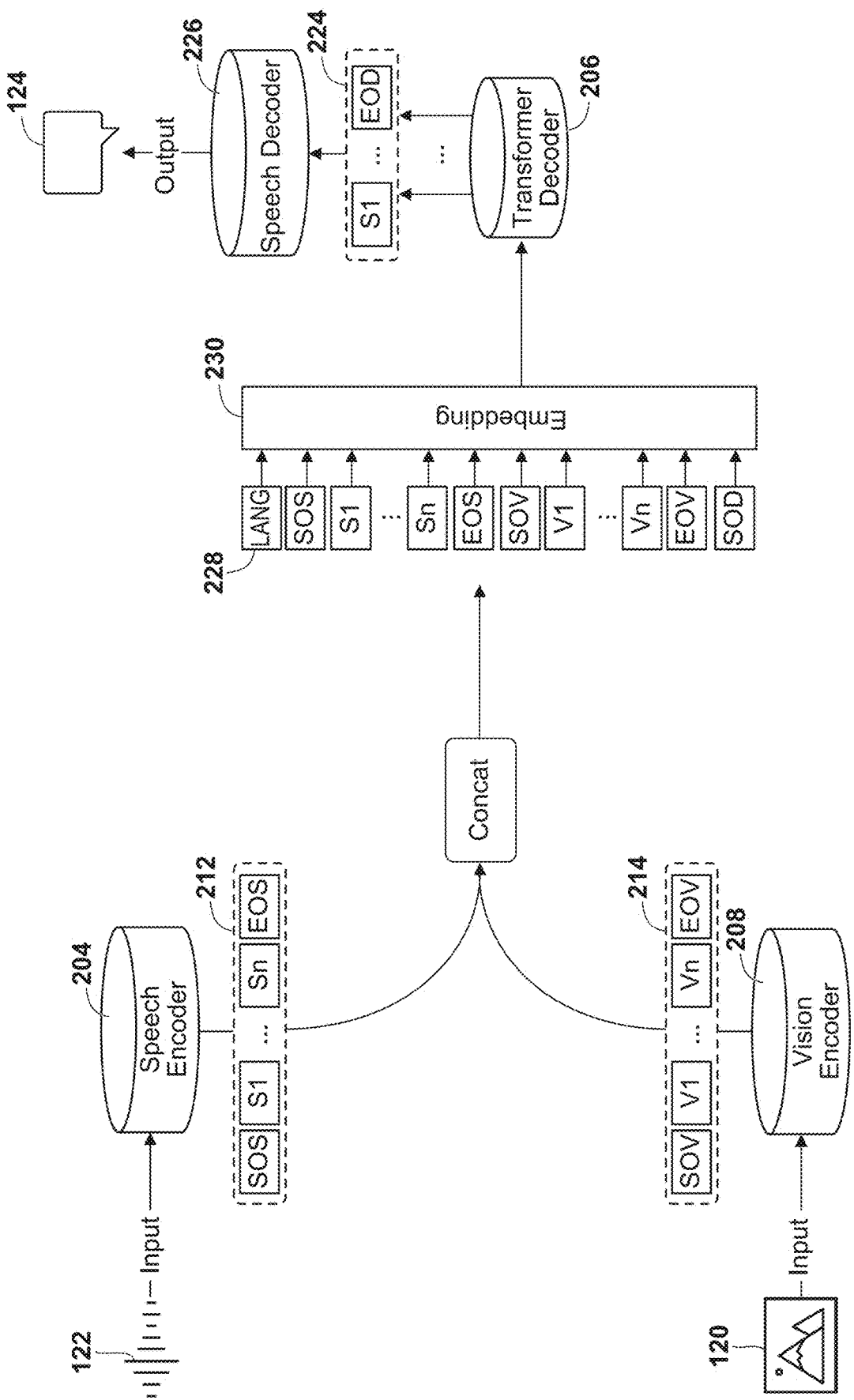

FIGS. 2A and 2B depict functional block diagrams of the system of FIG. 1, according to example embodiments. A user may use the system to generate an audio description for an image or video in a brief voice clip submitted by the user.

As depicted in FIG. 2A, a voice clip 122 can be retrieved or received. The voice clip 122 corresponds to an audio file or audio data comprising a voice recording or clip. In particular, the voice clip 122 can be a voice recording capturing an utterance or voice of a person/speaker (e.g., a user), by example of the person speaking one or more words, sentences, and/or phrases. The system may provide the words to be spoken by a user, for example by providing the user with text of the spoken content such as a series of words or short sentences. In some embodiments, the system does not provide the spoken content, and the user may speak any words/sentences of their own choosing. The voice clip 122 can be a short voice recording of 15 to 60 seconds, in particular between 15 and 30 seconds, such that the voice clip 122 can be used to capture the voice print or voice characteristics of the speaker.

The voice clip 122 can be captured by a recording device such as a microphone comprising part of the device 104. Alternatively, the voice clip 122 can be extracted as audio data, for example the audio track of a video. Note that while the speaker in the voice clip 122 may be the user, the speaker may be a different person entirely, for example the voice clip 122 may be retrieved by the user from external sources and comprise a voice recording of an unrelated person such as a celebrity. The voice clip 122 may be received or converted to a suitable audio waveform format, such as WAV, FLAC, MP3, AAC, etc. In some embodiments, the voice clip 122 may be recorded as an audio file at a suitable sample rate, such as a sample rate of the capturing device (e.g., microphone) or file generating device. The raw audio can then be resampled to a target sample rate, such as 16 kHz.

The voice clip 122 can be processed by a first transformer 204 to generate audio tokens 212. The voice clip 122 can be converted to a suitable format for model processing. For example, raw audio (e.g., WAV, MP3) can be converted to a spectrogram for processing by a CNN or a transformer.

The first transformer 204 can be an audio or speech transformer comprising one or more machine learning models. In particular, the first transformer 204 may be an encoder-decoder pair and may be a transformer-based encoder-decoder. That is, the first transformer 204 can comprise an encoder that converts the voice clip 122 into audio representations and a decoder that converts the audio representations into audio vectors. The first transformer 204 can comprise one or more machine learning models including recurrent neural networks (RNNs), convolutional neural networks (CNNs), transformer networks, or combinations thereof, although other types of machine learning models are possible as well.

The audio tokens 212 correspond to vectors of a fixed length and/or dimension. A maximum number of tokens may be set to 512, 1024, or higher. The audio tokens 212 can capture the voice print or voice characteristics of the speaker. In particular, the audio features in a spectrogram of the voice clip 122 can be determined by the first transformer 204. Note that the first transformer 204 may be a pre-trained transformer which had been trained to capture the voice print of a speaker when given input audio data.

Further, an image or video 120 can be retrieved or received. The image/video 120 corresponds to an image/video file or image/video data (as the case may be) depicting or showing contents for which the audio description is to be generated, for example a scene or a series of events. In case of a video, the video can be processed as a series of images, each corresponding to a frame in the video. In embodiments where a video 120 is retrieved, the video itself can be a short video clip, for example between 5 and 60 seconds, in particular between 10 and 30 seconds. The image/video 120 can be captured by a capturing device such as a camera. Alternatively, the image/video 120 can be retrieved from external sources such as an external database. For an image 120 a suitable format for the image 120 to be received in or converted to may be JPEG, PNG, TIFF, etc., although other representations are possible as well. For a video 120, a suitable format for the video 120 to be received in or converted to may be MP4, MKV, AVI, etc., although other representations are possible as well. In some embodiments, the audio data from the video 120 may be removed. For example, the audio track from the video file of the video 120 can be removed. In particular, the video 120 may be converted to a series of individual frames, each analogous to a single image 120 and utilized in the same format.

Note that the image/video 120 may be completely distinct or different from the voice clip 122. That is, the image/video 120, particularly the depicted content, can be completely unrelated to the voice clip 122. For example, at least some words comprising the audio description of the image/video 120 that is ultimately generated may not be present in the voice clip 122, in which case those words are generated in a zero-shot manner.

The image/video 120 can be processed by a second transformer 208 to generate visual tokens 214. The second transformer 208 can be a visual transformer comprising one or more machine learning models. In particular, the second transformer 208 may be an encoder-decoder pair and may be a transformer-based encoder-decoder. That is, the second transformer 208 can comprise an encoder that converts the image/video 120 into visual representations and a decoder that converts the visual representations into visual vectors. In particular, the second transformer 208 can comprise one or more machine learning models including RNNs, CNNs, transformer networks, or combinations thereof although other types of machine learning models are possible as well.

The image/video 120 can be converted to a suitable format for model processing. For example, each frame can be treated as a still image for processing. Note that each image/frame may be rendered/received at any suitable size/resolution and resampled to a predefined size/resolution prior to processing. In some embodiments, each frame/image may be processed in patches of 16 pixels by 16 pixels. For a video 120, the second transformer 208 may process the frames of the video 120 jointly. Alternatively, the second transformer 208 may process the frames of the video 120 individually in series or distribute the processing of the frames to a plurality of chained machine learning models. In particular, the second transformer 208 can process the frames of the video 120 individually (in series), where frame skipping may be performed based on the number of frames (e.g., video length) or predefined rules to reduce computation costs. In some embodiments, the frames may be processed in batches.

The visual tokens 214 may correspond to vectors of a fixed length and/or dimension. In particular, regardless of the amount of input data (e.g., a single image/frame or a plurality of frames), the length/dimension of the vectors may be fixed. A maximum number of tokens may be set to 512, 1024, or higher. The visual tokens 214 can capture the depicted content/events (e.g., visual features) of the image/video 120. Note that the second transformer 208 may be a pre-trained transformer which had been trained to capture the image/video classification or visual feature generation when given an input image or video.

The audio tokens 212 and the visual tokens 214 are processed by a decoder 206 to generate acoustic tokens 224. The acoustic tokens 224 can correspond to a vector representation of the audio description of the image/video 120 in the speaker's voice. In particular, the audio tokens 212 and visual tokens 214 may be jointly input to the decoder 206 and/or processed, for example by concatenating the audio tokens 212 and visual tokens 214 and inputting the resulting concatenated vector(s) to the decoder 206. To identify the beginning and end of the audio tokens 212 and visual tokens 214, the audio tokens may be wrapped (e.g., prepended and appended) with a start of audio token and an end of audio token and the visual tokens may be wrapped with a start of visual token and an end of visual token. In some embodiments, the decoder 206 can ingest the audio tokens 212 and visual tokens 214 as vectors by converting the audio tokens 212 and the visual tokens 214 into audio and visual vectors, respectively. In particular, an input vector can be generated as continuous vectors by passing the concatenated tokens 212, 214 into an embedding layer 230 to convert the tokens into the corresponding vectors. In some embodiments, the embedding layer 230 can also process the input tokens (e.g., concatenated tokens 212, 214) to generate embeddings instead of the input vector for ingesting by the decoder 206. Note that a start generation token may be added to the end of the input vector 230 to signal the decoder 206 to start generating the acoustic tokens 224. In some embodiments, the decoder 206 can comprise the embedding layer 230.

In some embodiments, a language token 228 may be processed by the decoder 206, for example with the audio tokens 212 and visual tokens 214. The language token 228 can be used to specify an output language for the audio description, where a particular language token would correspond to a particular language. The input language token can correspond to, for example, a user-specified language in which the audio description is to be spoken. In particular, the language token 228 may be concatenated (e.g., prepended or appended) with the audio tokens 212 and visual tokens 214 for processing by the decoder 206. For example, the language token 228 can also form part of the input vector by passing the language token 228 to the embedding layer 230 with the tokens 212, 214 and converting it to vector(s). Accordingly, the acoustic tokens 224 can correspond to an audio description of the image/video 120 in the voice of the speaker and in a user-specified language. Note that the language corresponding to the language token 228 is not required to be the same language as spoken by the speaker in the voice clip 122. As such, the audio description can be generated in languages other than what was captured in the voice clip 122, even if the speaker does not speak the desired audio description language.

To process the input vector to generate the acoustic tokens 224, the decoder 206 can attend on the tokens 212, 214, and 228. That is, while the tokens 212, 214, and 228 are distinct from one another, the decoder 206 can self attend on the input vector 230 to generate the acoustic tokens 224, which provides both the audio features from the speaker's voice print and the visual features from the content depicted in the given image/video such that the audio description can be output in the speaker's voice, optionally in a chosen language. In some embodiments, a default language token 228 coding a default language may be included in cases where a language is not specified by the user 102. For example, the default language may be the original spoken language of the voice clip 122, as detected. Alternatively, the default language may be pre-defined according to device configurations of the device 104 or set by the user 102/system itself. A maximum number of acoustic tokens may be set to 512, 1024, or higher.

The decoder 206 can be a transformer decoder with an auto-regressive architecture. In particular, the concatenated input vector output by the embeddings layer 230 can be causally attended on previous learnable hidden states thereof. The concatenated input vector also attends over the entirely of the input vector (e.g., tokens 212, 214, 228). To generate the acoustic tokens 224 can be output in sequence, where the decoder 206 can also attend on the previously generated acoustic tokens (e.g., vectors corresponding thereto) in the sequence to generate the next token in the sequence. Accordingly, the decoder 206 can fuse the encoded audio and visual features corresponding to the voice print of the speaker and the depicted content of the image/video 120 (and optionally the output language) as to generated audio description in the voice of the speaker (and the output language).

The decoder 206 may generate the tokens 224 in sequence until the maximum token number or output length has been reached or until an end token for the acoustic tokens is generated or encountered.

Figure 2C:
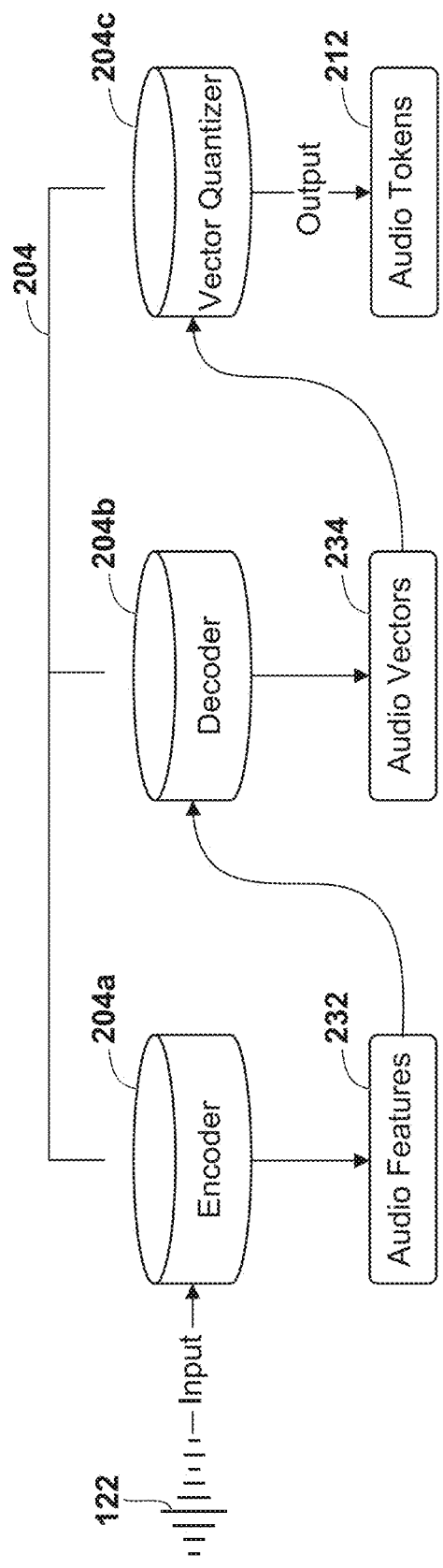
FIGS. 2C and 2D respectively depict generation of audio and visual tokens using the system of FIG. 1.
Figure 2D:
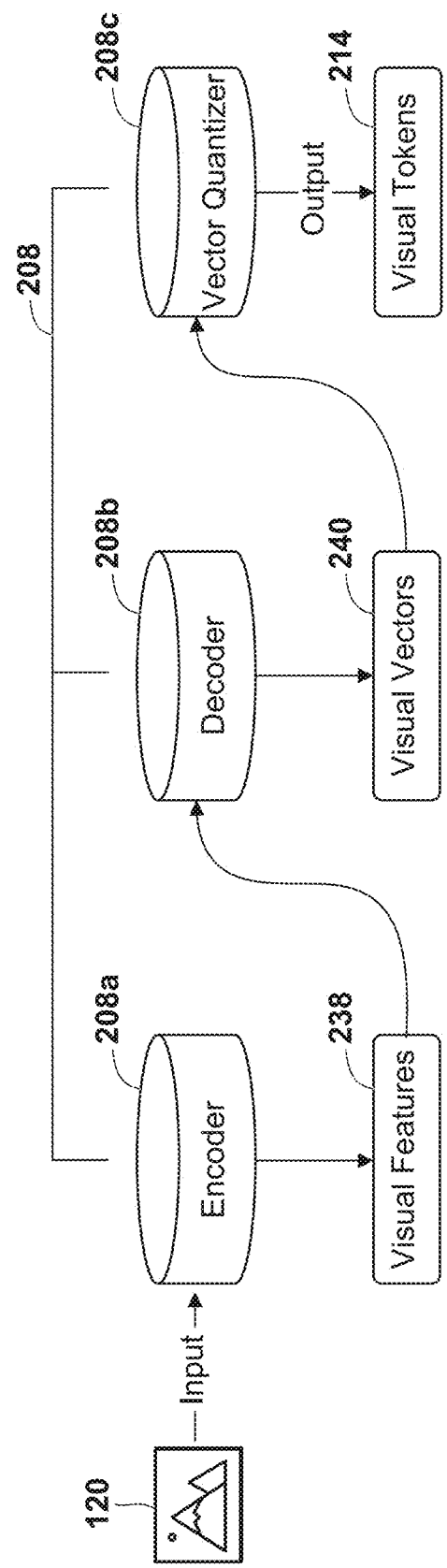

FIGS. 2C and 2D depict the generation of the audio tokens 212 and the visual tokens 214 by the first transformer 204 and the second transformer 208, respectively. As shown in FIGS. 2C and 2D, the first transformer 204 can comprise an encoder 204a, a decoder 204b, and a vector quantizer 204c; similarly, the second transformer 208 can comprise an encoder 208a, a decoder 208b, and a vector quantizer 208c. The models 204a-204c and 208a-208c may be two series of chained models.

Referring to FIG. 2C, the encoder 204a processes the voice clip 122 to extract audio features 232. The audio features 232 are audio representations of the voice clip 122, for example learned or modeled vector representation of the speaker's voice. For example, the spectrogram of the of the voice clip 122 can be processed by the encoder 204a to identify the voice print of the speaker, which can be extracted as the audio features 232. The audio features 232 may be output as audio embeddings, which are vectors of a fixed length and/or dimension. The audio embeddings can be ingested by the coupled decoder 204b to generate audio vectors 234. The decoder 204b can attend on the entirety of the audio embeddings, including cross attending on all states generated by the encoder 204a and self attending on the previous learned hidden states. The audio vectors 234 can correspond to the voice print of the speaker, and are of a fixed length and/or dimension. The audio vectors 234 are used to generate the audio tokens 212 by guiding the sequential generation of the tokens. In some embodiments, the size of each vector is 348.

A vector quantizer 204c can ingest the audio vectors 234 to generate the audio tokens 212. The vector quantizer 204c can comprise a learnable codebook comprising a set of learnable vectors which maps the audio vectors 234 into the audio tokens 212. For example, each vector can be mapped into a corresponding audio token in the audio tokens 212 with which they have the most similarity. For example, each vector in the audio vectors 234 is mapped to a nearest vector from the learnable codebook by generating discrete indices that correspond to entries in the vectors of the learnable codebook. Note that as the input audio vectors 234 can be replaced with codebook indices, the vector may be effectively "compressed". Accordingly, the vector quantizer 204c can discretize the audio vectors 234 into discrete audio tokens 212.

Referring to FIG. 2D, the encoder 208a processes the image/video 120 to extract visual features 238. The visual features 238 are visual representations of the image/video 120, for example learned or modeled vector representation of the content depicted in the image/video 120. For example, the image or individual frames can be processed by the encoder 208a to determine the depicted content, which can be extracted as the visual features 238. The visual features 238 may be output as visual embeddings, which are vectors of a fixed length and/or dimension. The visual embeddings can be ingested by the coupled decoder 208b to generate visual vectors 240. The decoder 208b can attend on the entirety of the visual embeddings, including cross attending on all states generated by the encoder 208a and self attending on the previous learned hidden states. The visual vectors 240 can correspond to the depicted content, and are of a fixed length and/or dimension. The visual vectors 240 are used to generate the visual tokens 214 by guiding the sequential generation of the tokens. In some embodiments, the size of each vector is 348.

A vector quantizer 208c can ingest the visual vectors 240 to generate the visual tokens 214. The vector quantizer 208c can comprise a learnable codebook comprising a set of learnable vectors which maps the visual vectors 240 into the visual tokens 214. For example, each vector can be mapped into a corresponding visual token in the visual tokens 214 with which they have the most similarity. For example, each vector in the visual vectors 240 is mapped to a nearest vector from the learnable codebook by generating discrete indices that correspond to entries in the vectors of the learnable codebook. Note that as the input visual vectors 240 can be replaced with codebook indices, the vector may be effectively "compressed". Accordingly, the vector quantizer 208c can discretize the visual vectors 240 into discrete visual tokens 214.

The transformers 204, 208 may be pre-trained transformers that had been trained to respectively generate audio and visual tokens. Specifically, the models 204a-c and 208a-c may be pre-trained models jointly trained respectively. Encoders 204a and 208a may be trained to respectively extract audio and visual features from the inputs 120, 122; decoders 204b and 208b may be trained to respectively convert audio and visual features to audio and visual vectors; the vector quantizers 204c and 208c may be trained to update the learnable codebook. In some embodiments, the vector quantizers 204c and 208c is each a Vector Quantized Variational Autoencoder (VQVAE) vector quantizer, although other vector quantizers can be used as well.

Further, while FIGS. 2C and 2D depict the transformers 204 and 208 as a plurality of models, in particular a combined/coupled plurality of models, the transformers 204 and 208 can each be a single machine learning model, for example a single transformer model.

Note that the decoder 206 can generate the acoustic tokens 224 using zero-shot learning, as the decoder 206 is not trained with a speaker whose voice is directly used in the audio description, nor is the user prompted to provide any audio description of an image/video by description the contents contained therein. As described, the acoustic tokens 224 correspond to the audio description 124 in the voice of the speaker from the voice clip 122. The acoustic tokens 224 may be generated in a zero-shot manner as the words within the audio description 124 are not required to be spoken by the speaker, even where the spoken languages of the voice clip 122 and the audio description 124 are the same. That is, the models 204, 206, 208 need not learn from not be provided with examples of the words in the audio description 124, spoken in the voice of the speaker. Additionally, it is possible for the audio description 124 to include words that overlap with one or more spoken words in the voice clip 122 (e.g., common words such as "the", "a", "people", etc.); these overlapped words are not required to be spoken by the speaker and the models 204, 206, 208 need not rely on these words to generate the acoustic tokens 224. In at least some embodiments in which some of the audio description is reproduced in a non-zero-shot manner (e.g., a one-shot manner) based on identical words in the voice clip 122, words in the audio description not present in the voice clip 122 are nonetheless generated in a zero-shot manner. Accordingly, at least some (and in some embodiments, all) of the audio description is generated in a zero-shot manner.

The acoustic tokens 224 can be processed by a speech decoder 226 to generate a waveform representation of the audio description 124 from the acoustic tokens 224. In some embodiments, the acoustic tokens 224 can be wrapped (e.g., prepended and appended) with a start and end token and ingested by the speech decoder 226 to detokenize the acoustic tokens 224 into the corresponding waveform. Alternatively, the acoustic tokens 224 may not include start and end tokens (or may have the start and/or end tokens removed) and can be passed directly to the speech decoder 226. The waveform corresponds to the audio description of the image/video 120 in the voice of the speaker from the voice clip 122. The speech decoder 226 can be a pre-trained decoder which has been trained to translate acoustic tokens into the corresponding audio waveform. In some embodiments, the speech decoder 226 and the decoder 206 can be jointly implemented as a single model or a combined/coupled plurality of models. For example, a model may receive the tokens 224, 226 or the input vector comprising the tokens 224, 226 and directly convert them into the audio waveform corresponding to the audio description 124.

To generate the audio corresponding to the audio description 124, that is, to play the audio description 124, the generated waveform can be converted to audible sound using a suitable program, player or algorithm. In some embodiments, the audio waveform can be generated in a standard format including but not limited to FLAC, WAV, MP3. A corresponding audio playback framework, for example a digital to analog converter can be used to output the waveform as sound, for example out of an audio output device of or coupled to a user device. In some embodiments, the audio waveform can be generated as an audio representation such as a mel-spectrogram. As such, a vocoder or similar program/algorithm can be used to convert the audio waveform into audible sound for playback. In some embodiments, the audio description 124, for example the audio waveform thereof, can be stored to the user device or one or more databases. Note that as the audio description 124 can contain words/phrases not included in the voice clip 122 or in a different language from the one spoken in the voice clip 122, the disclosed system can perform zero-shot generating of the audio description 124.

Referring now to FIG. 2B, in which a system substantially analogous to the system of FIG. 2A is depicted. As shown in FIG. 2A, the voice clip 122 is encoded by the first transformer (speech transformer) 204 into audio tokens 212, which are wrapped with a start and end token. The image/video 120 is encoded by the second transformer (vision/visual transformer) 208 into visual tokens 214, which are wrapped with a start and end token as well. The audio tokens 212 and visual tokens 214 are concatenated along with the language token 228, and transformed into an input vector by the embedding layer 230, which is ingested by the decoder 206 to generate the acoustic tokens 224. The speech decoder 226 then detokenizes the acoustic tokens 224 into audio waveform corresponding to the audio description 124.

Figure 3:
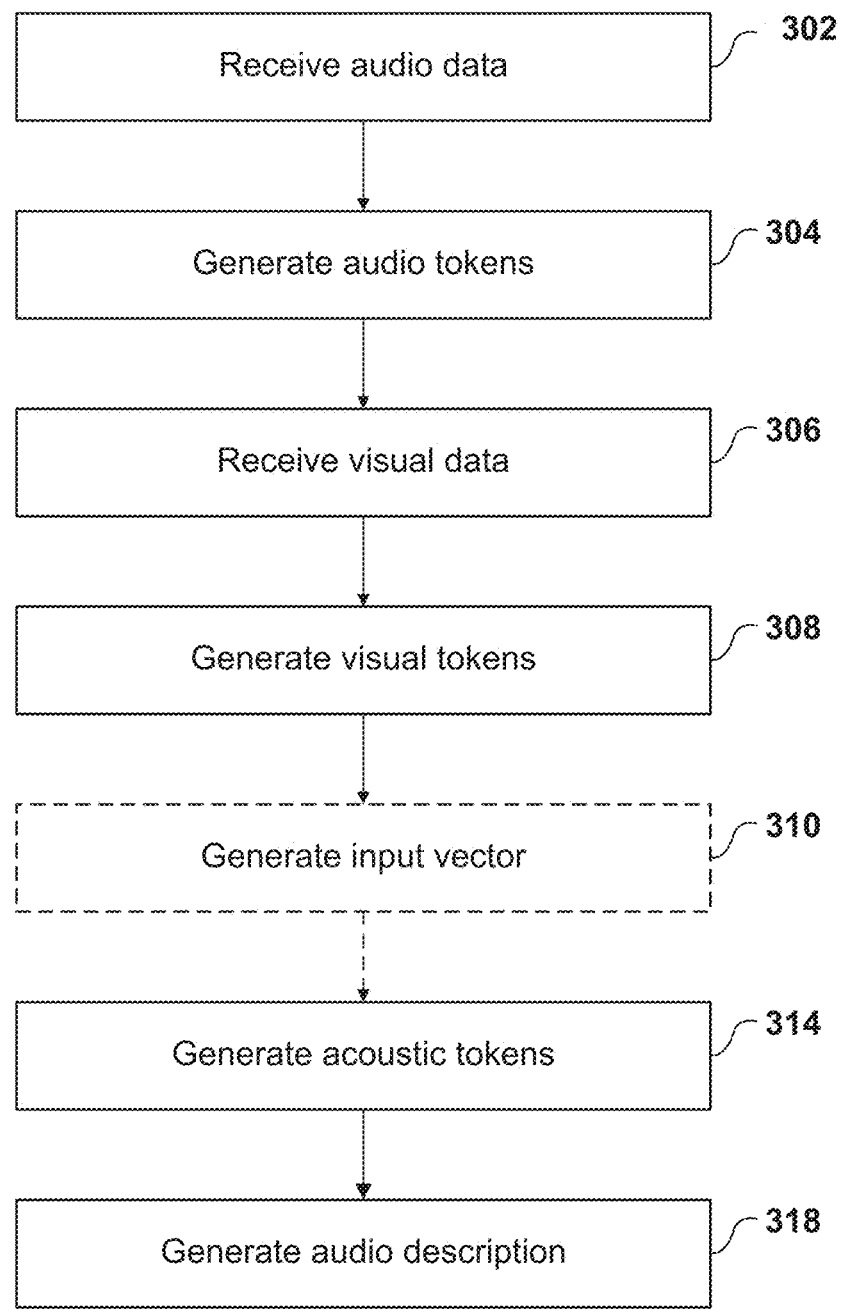
FIG. 3 depicts a method for generating audio descriptions, according to an example embodiment.

FIG. 3 depicts a method for generating an audio description in a user submitted voice, for example using the system of FIGS. 1-2D, according to an example embodiment.

At 302, audio data is received or retrieved, for example from a device of a user. The audio data corresponds to a voice clip capturing the voice of a speaker, in particular capturing a voice which an audio description should be output (spoken) in. The audio data can be captured in any suitable format and may be converted to a spectrogram for processing. At 304, a first transformer corresponding to an audio transformer processes the audio data to generate audio tokens in order to capture audio features, for example the voice print or voice characteristics of the speaker in the audio data. In particular, the first transformer can be a transformer-based encoder-decoder pair comprising a series of models including an encoder, a decoder, and a vector quantizer. The encoder can generate the audio representations corresponding to the voice print of the user from the audio data as audio embeddings. The decoder can generate the audio vectors corresponding to the audio embeddings. The vector quantizer can map the audio vectors to the audio tokens.

At 306, visual data is received or retrieved, for example from the device of the user. The visual data corresponds to an image or video clip, in particular capturing contents/events for which the audio description describes or captions. The visual data can be captured in any suitable format and may be converted to individual image data for processing. For example, audio may be removed from the video clip and frames may be extracted from the video clip for processing. At 308, a second transformer corresponding to a visual transformer processes the visual data to generate visual tokens in order to capture visual features, for example the contents and/or events depicted in the image or video clip. In particular, the second transformer can be a transformer based encoder-decoder pair comprising a series of models including an encoder, a decoder, and a vector quantizer. The encoder can generate the visual representations corresponding to the depicted content of the visual data as visual embeddings. The decoder can generate the visual vectors corresponding to the visual embeddings. The vector quantizer can map the visual vectors to the visual tokens.

At 310 an input vector comprising the audio and visual tokens can be generated for processing by a decoder. Each set of tokens can be wrapped and identified using a start and end token. In some embodiments, a language token indicating an output (spoken) language of the audio description (e.g., selected by the user) can also be inserted into the input vector such that audio description can be provided in a language not spoken by the speaker in the received audio data. The tokens can be catenated passed to an embeddings layer to generate the input vector. In some embodiments, acoustic tokens can be generated at 314 using the decoder. In particular, the decoder can merge the input tokens into a set of acoustic tokens which captures the contents/events in the visual data in the speaker's voice by combining the processed audio and visual features. The acoustic tokens correspond to the audio description of the contents/events in the visual data in the speaker's voice and in a selected language, if applicable.

At 318, audio description of the contents/events in the visual data in the speaker's voice is generated from the acoustic tokens. For example, a speech decoder can be used to decode/detokenize the acoustic tokens into an audio waveform in a suitable format. The audio waveform of the audio description can be stored to the device of the user and/or output, for example using a speaker of or coupled to the device of the user such that the audio description of the visual data is provided in the speaker voice of the audio data.

It would be appreciated by one of ordinary skill in the art that the system and components shown in the figures may include components not shown in the drawings. For simplicity and clarity of the illustration, elements in the figures are not necessarily to scale and are only schematic. It will be apparent to persons skilled in the art that a number of variations and modifications can be made without departing from the scope of the invention as described herein.

It is contemplated that any part of any aspect or embodiment discussed in this specification can be implemented or combined with any part of any other aspect or embodiment discussed in this specification, so long as such those parts are not mutually exclusive with each other.

It should be recognized that features and aspects of the various examples provided above can be combined into further examples that also fall within the scope of the present disclosure.

When used in this specification and claims, the terms "comprises" and "comprising" and variations thereof mean that the specified features, steps or integers are included. The terms are not to be interpreted to exclude the presence of other features, steps or components. Further, as used herein, the term "comprising" can mean "including." Variations of the word "comprising", such as "comprise" and "comprises," have correspondingly varied meanings. Thus, for example, a composition "comprising" X may consist exclusively of X or may include one or more additional unrecited components. It will be understood that in embodiments which comprise or may comprise a specified feature or variable or parameter, alternative embodiments may consist, or consist essentially of such features, or variables or parameters. A reference to an element by the indefinite article "a" does not exclude the possibility that more than one of the elements is present, unless the context clearly requires that there be one and only one of the elements.

Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

The terms are not to be interpreted to exclude the presence of other features, steps or components. Further, the singular forms "a", "an", and "the" are intended to include the plural forms as well, unless the context clearly indicates otherwise.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present. Further, in this disclosure, the term "or" is generally employed in its sense including "and/or" unless the content clearly dictates otherwise.

The invention claimed is:

1. An audio description generation method, comprising:
receiving audio data comprising a voice of a speaker;
processing the audio data with a first machine learning model to generate audio tokens for the voice;
processing visual data corresponding to an image or a video separate from the audio data with a second machine learning model to generate visual tokens for the visual data; and
generating an audio description for the visual data using the voice by processing the audio tokens and visual tokens with a decoder, wherein at least some of the audio description is generated in a zero-shot manner,
wherein the first and second machine learning models are each a transformer encoder-decoder model.

2. The method of claim 1,
wherein the audio data is a voice clip of an utterance of the speaker captured by a device; and
wherein the audio embeddings correspond to a voice print of the speaker.

3. The method of claim 1, wherein the voice clip is less than 30 seconds in length.

4. The method of claim 1, wherein the visual data is an image or video clip captured by a device.

5. The method of claim 1,
wherein the audio tokens are wrapped with a start of audio token and an end of audio token; and
wherein the visual tokens are wrapped with a start of visual token and an end of visual token.

6. The method of claim 1, wherein the audio tokens and visual tokens are concatenated into an embedding layer for processing by the decoder.

7. The method of claim 1, wherein a language token corresponding to a language of the audio description is processed with the audio tokens and the visual tokens by the decoder.

8. The method of claim 1, wherein the generating comprises:
generating acoustic tokens corresponding to the audio description using the decoder; and
translating the acoustic tokens into an output audio waveform using a speech decoder;
wherein the output audio waveform corresponds to the audio description of the image or video in the voice of the speaker.

9. The method of claim 1, wherein the processing of the audio data comprises:
generating audio embeddings by processing the audio data using an audio decoder of the first machine learning model;
generating audio vectors by processing the audio embeddings using an audio decoder of the first machine learning model; and
generating the audio tokens by processing the audio vectors using an audio vector quantizer of the first machine learning model.

10. The method of claim 9,
wherein the audio embeddings are audio representations of a first predetermined length; and
wherein the audio vectors are audio representations of a second predetermined length.

11. The method of claim 1, wherein the processing of the visual data comprises:
generating visual embeddings by processing the visual data using a visual decoder of the second machine learning model;
generating visual vectors by processing the visual embeddings using a visual decoder of the second machine learning model; and
generating the visual tokens by processing the visual vectors using a visual vector quantizer of the second machine learning model.

12. The method of claim 11,
wherein the visual embeddings are visual representations of a third predetermined length; and
wherein the visual vectors are visual representations of a fourth predetermined length.

13. The method of claim 1, wherein the decoder is a transformer decoder.

14. The method of claim 1,
wherein the audio data is an input audio waveform; and
wherein the method further comprises: converting the input audio waveform into a mel-spectrogram for processing by the first machine learning model.

15. The method of claim 1,
wherein the visual data is a video; and
wherein the method further comprises: extracting the frames of the video as visual data for processing by the second machine learning model.

16. The method of claim 1,
wherein the audio tokens comprise a first predetermined number of tokens; and wherein the visual tokens comprise a second predetermined number of tokens.

17. The method of claim 1, further comprising: playing the audio description.

18. The method of claim 1, further comprising: capturing the audio data and/or the visual data.

19. A system comprising at least one processing unit configured to perform an audio description generation method comprising:
receiving audio data comprising a voice of a speaker;
processing the audio data with a first machine learning model to generate audio tokens for the voice;
processing visual data corresponding to an image or a video separate from the audio data with a second machine learning model to generate visual tokens for the visual data; and
generating an audio description for the visual data using the voice by processing the audio tokens and visual tokens with a decoder, wherein at least some of the audio description is generated in a zero-shot manner,
wherein the first and second machine learning models are each a transformer encoder-decoder model.

20. A non-transitory computer medium storing computer readable instructions, which, when executed by at least one processing unit, configure the at least one processing unit to perform an audio description generation method comprising:
receiving audio data comprising a voice of a speaker;
processing the audio data with a first machine learning model to generate audio tokens for the voice;

processing visual data corresponding to an image or a video separate from the audio data with a second machine learning model to generate visual tokens for the visual data; and generating an audio description for the visual data using the voice by processing the audio tokens and visual tokens with a decoder, wherein at least some of the audio description is generated in a zero-shot manner, wherein the first and second machine learning models are each a transformer encoder-decoder model.

* * * * *